(12) United States Patent
Ecrabey et al.

(10) Patent No.: US 7,952,899 B2
(45) Date of Patent: May 31, 2011

(54) ALTERNATING VOLTAGE GENERATOR EQUIPPED WITH A CURRENT LIMITING DEVICE

(75) Inventors: Jacques Ecrabey, Guilherand Granges (FR); Sébastien Carcouet, Vif (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 324 days.

(21) Appl. No.: 12/337,049

(22) Filed: Dec. 17, 2008

(65) Prior Publication Data

US 2009/0154201 A1 Jun. 18, 2009

(30) Foreign Application Priority Data

Dec. 17, 2007 (FR) ...................................... 07 59870

(51) Int. Cl.
*H02H 7/122* (2006.01)
(52) U.S. Cl. ...................................... 363/56.03; 363/37
(58) Field of Classification Search .................... 363/17, 363/37, 55–56.04, 98
See application file for complete search history.

(56) References Cited

U.S. PATENT DOCUMENTS

| 4,879,639 | A | * | 11/1989 | Tsukahara ...................... 363/37 |
| 5,237,633 | A | | 8/1993 | Gaw et al. |
| 5,631,813 | A | * | 5/1997 | Ikeshita ......................... 363/37 |
| 6,353,545 | B1 | * | 3/2002 | Ueda .......................... 363/56.03 |
| 6,392,908 | B2 | * | 5/2002 | Miyazaki et al. .......... 363/56.02 |
| 6,426,885 | B1 | * | 7/2002 | Sekiguchi et al. ......... 363/56.01 |
| 2005/0135129 | A1 | | 6/2005 | Kazutoshi |

FOREIGN PATENT DOCUMENTS

| JP | 59-054340 | 3/1984 |
| JP | 03-065020 | 3/1991 |
| JP | 03-082373 | 4/1991 |
| JP | 03-257934 | 11/1991 |
| JP | 04-273718 | 9/1992 |

\* cited by examiner

*Primary Examiner* — Jessica Han
(74) *Attorney, Agent, or Firm* — Oblon, Spivak, McClelland, Maier & Neustadt, L.L.P.

(57) ABSTRACT

The invention relates to an alternating voltage generator (10) comprising a direct voltage source (20) that supplies a power bus, a bus capacitor (11) connected to the power bus, an inverter module (30) supplied by the power bus and equipped with several normally-on JFET power transistors (31a, 31b) in order to deliver an alternating voltage. The generator (10) comprises a current limiting normally-on JFET transistor (12) which is located on the power bus in series between the bus capacitor (11) and the inverter module (30), the limiting current of the limiting transistor (12) being less than the limiting current of each of the power transistors (31a, 31b).

8 Claims, 1 Drawing Sheet

ALTERNATING VOLTAGE GENERATOR EQUIPPED WITH A CURRENT LIMITING DEVICE

Figure 1:
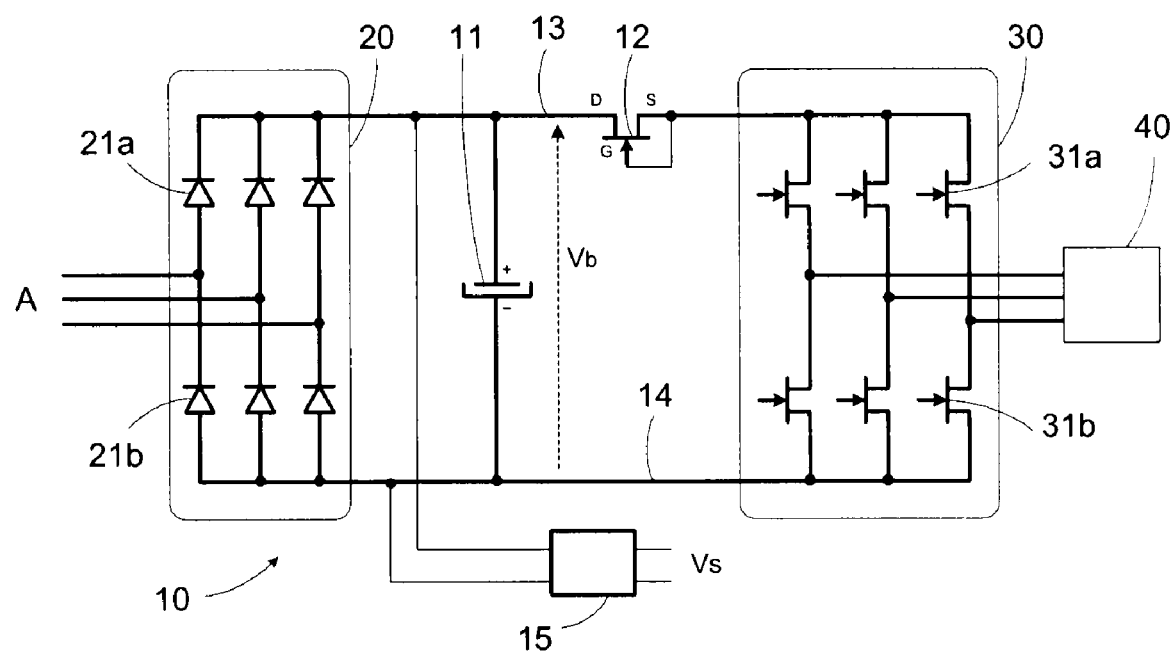

The present invention relates to an alternating voltage generator that uses normally-on JFET (Junction Field Effect Transistor) power switches to deliver an alternating voltage from a DC bus and which comprises a current limiting device limiting the current of this DC bus. Such a generator may in particular be used in a speed controller or in an Uninterruptible Power Supply (UPS).

A JFET transistor is a known electronic power switch that comprises a control gate whose function is to permit or not to permit a current to pass between a drain and a source. Such a transistor is said to be of the "normally on" type if the voltage $V_{DS}$ between the drain and the source is close to zero when the voltage $V_{GS}$ between the gate and the source is close to zero. This means that the drain-source path is conducting in the absence of a control voltage $V_{GS}$ or in the presence of a low voltage $V_{GS}$. Conversely, a JFET transistor is said to be of the "normally off" type if the drain-source path is not conducting in the absence of a voltage $V_{GS}$ between the gate and the source.

It turns out that a normally-on JFET electronic switch offers better performance than other types of voltage-controlled electronic power switches, such as MOSFETs, IGBTs or even normally-off JFET switches. Indeed, such a switch has in particular the advantages of being faster at switching, of generating less conduction losses in the conducting state (low resistance $R_{DSon}$ in the conducting state), of having better temperature behaviour and of having a smaller size.

Nevertheless, every normally-on electronic switch has the drawback of being in the conducting (or on) state in the absence of a control voltage at its gate. This feature is not conducive to safety for the control of large currents, as this switch allows the current to pass between drain and source in the absence of a control at the gate. Significant potential risks for the safety of goods and people obviously result from this.

An alternating voltage generator is usually intended to control a load, called the "user load" in the following, with an alternating voltage that may be of variable amplitude and frequency by means of a control by Pulse Width Modulation (PWM). This user load may be, in particular, an electrical motor in the case of a speed controller or a user alternative electrical network in the case of an uninterruptible power supply. The alternating voltage generator usually comprises an inverter module which is supplied by a DC power bus and which is equipped with two electronic power switches per branch or phase.

Each of these electronic power switches is controlled by a control circuit which is supplied by a power supply module, for example a Switched Mode Power Supply (SMPS), this power supply module in turn receiving its energy from the power bus.

The use of normally-on JFET transistors as electronic power switches of the inverter module of an alternating voltage generator has the previously described advantages, in particular very low conduction losses. However, this makes it necessary that on the application of voltage it must be capable, as quickly as possible, of controlling the opening of these JFET transistors in order to avoid a short circuit in each branch of the inverter module. In addition to risks of damage and safety risks, such a short circuit would also prevent the voltage of the DC power bus of the generator from being increased. This is why it is advisable to find a device that enables a very quick increase in the voltage of the power bus and of the power supply module so as to be quickly able to supply the control circuits of the JFET power transistors.

The aim of the invention is therefore to find a simple device that enables, on application of a current, the current flowing in the DC power bus to be limited and to provide quickly the energy necessary for supplying the control circuits of the JFET transistors of the inverter module.

To do this, the invention describes an alternating voltage generator comprising a direct voltage source that supplies a power bus, a bus capacitor connected between a positive terminal and a negative terminal of the power bus, an inverter module supplied by the power bus and equipped with several normally-on JFET power transistors in order to deliver an alternating voltage. The generator comprises a current limiting normally-on JFET transistor which is located on the power bus in series between the bus capacitor and the inverter module, the limiting current of the limiting transistor being less than the limiting current of each of the power transistors.

According to one feature, the source of the limiting transistor is connected to the gate of the limiting transistor. According to another feature, the alternating voltage generator comprises a power supply module that is supplied by the power bus and which delivers an output voltage to a control module intended to control the gates of the power transistors.

According to another feature, the direct voltage source comprises a rectifier module that is supplied by an external power supply network and which is equipped with several diodes.

Such a generator may in particular be used in a speed controller intended to deliver alternating voltage to an electric motor or in an uninterruptible power supply intended to deliver an alternating voltage to an alternative electrical network.

Further features and advantages will appear in the following detailed description, referring to an embodiment given by way of example and shown by FIG. 1, which shows a simplified structure of an alternating voltage generator according to the invention.

With reference to FIG. 1, an alternating voltage generator 10 comprises a direct voltage source which supplies a power bus with a direct voltage Vb (for example of around 200 to 800Vcc or more, according to the conditions of use). The power bus is composed of a positive line 13 and of a negative line 14. A bus capacitor 11 is usually used to keep the direct voltage Vb of the power bus constant. This bus capacitor 11 is connected between a positive terminal and a negative terminal of the power bus and is generally of the electrolytic type.

In the example of FIG. 1, the direct voltage source comprises a rectifier module 20 which is intended to rectify a three-phase alternating voltage coming from an external power supply network A (for example a three-phase 380Vac electrical network). This rectifier module advantageously uses diodes 21a, 21b which are more economical and more reliable than thyristors. Alternatively, the direct voltage source might also come directly from a battery delivering a direct voltage Vb, in particular in the case of an uninterruptible power supply.

The alternating voltage generator 10 next comprises an inverter module 30 enabling, from the power bus, control of a user load 40 with an alternating voltage that may be of variable amplitude and frequency. The inverter module 30 uses a control by Pulse Width Modulation (PWM). To do this, it is equipped with two electronic power switches 31a, 31b in series over each phase. These switches 31a, 31b are N-channel JFET power transistors that are normally on (i.e. in the conducting state in the absence of voltage at the transistor gate). It is also possible to use P-channel JFET transistors.

The power transistors 31a, 31b are controlled by a control module (not shown in the figure).

The example of FIG. 1 shows a three-phase alternating voltage generator 10: the inverter module 30 comprises three branches for delivering a three-phase alternating voltage to the user load 40, each branch being equipped with two power transistors 31a, 31b in series between a positive terminal and a negative terminal of the power bus, or a total of six power transistors.

The control module for the power transistors 31a, 31b is supplied by a power supply module 15 which delivers a direct output voltage Vs and which is itself supplied from the power bus. As indicated in FIG. 1, the connection of the power supply module 15 to the power bus is made upstream of the bus capacitor 11, between the rectifier module 20 and the capacitor 11. The power supply module 15 is preferably of the Switched Mode Power Supply (SMPS) type, which enables a quick increase in the output voltage Vs.

Currently, normally-on JFET transistors are often made of silicon carbide (SiC), but it is also possible to use any material with a high forbidden band energy gap (also called wide band gap materials), i.e. having low resistance in the conducting state $R_{DSon}$ and capable of withstanding large voltages, such as gallium nitride (GaN) for example.

Due to the use of normally-on power transistors 31a, 31b, it is obviously necessary to ensure that the control module for these transistors is supplied very quickly after the start of the increase in the voltage of the power bus, in order to avoid a short circuit in the various branches of the inverter module 30. It is therefore necessary to ensure that the power supply module 15 is capable of providing the output voltage Vs quickly after the start of the increase in the voltage of the power bus.

This is why the invention foresees that the alternating voltage generator 10 comprises a device limiting the current flowing in the power bus. This device comprises a current limiting normally-on JFET transistor 12 which is located on the power bus in series between the bus capacitor 11 and the inverter module 30. This limiting JFET transistor 12 is mounted as a current limiter, i.e. the source S of the transistor 12 is connected to the gate G of the transistor 12.

In the embodiment of FIG. 1, the limiting JFET transistor 12 is located on the positive line 13 of the power bus, the drain D of the transistor 12 being connected on the side of the capacitor 11 and the source S of the transistor 12 being connected on the side of the inverter module 30. It is also possible to locate the limiting JFET transistor 12 on the negative line 14 of the power bus, the drain D of the transistor 12 then being connected on the side of the inverter module 30 and the source S of the transistor 12 being connected on the side of the capacitor 11.

The gate G and the source S are preferably directly connected to each other such that the gate-source voltage $V_{GS}$ of the limiting JFET transistor 12 always remains equal to zero. It is also possible to envisage the gate G and the source S being connected to each other via a low resistance in order to maintain a voltage $V_{GS}$ slightly different from zero. This would enable the value of the limiting current to be adjusted to a different value from that corresponding to a zero $V_{GS}$ voltage.

The limiting JFET transistor 12 is chosen such that its limiting current $I_{L2}$ is of a lower value than the limiting current $I_{L3}$ of each of the different JFET power transistors 31a, 31b (for example $I_{L3}$=20A and $I_{L2}$=10A). In the normal conduction phase, the limiting JFET transistor 12 has a resistance $R_{DSon}$ in the conducting state which is very low, while the current $I_{DS}$ flowing between drain and source remains less than the limiting current $I_{L2}$. When the current $I_{DS}$ reaches the limiting current $I_{L2}$, the limiting JFET transistor 12 then shifts into the limiting phase, in which the current $I_{DS}$ remains limited to a value close to $I_{L2}$ while the resistance $R_{DS}$ and therefore the voltage $V_{DS}$ between drain and source increase quickly.

The operating principle of the generator 10 is the following:

It is assumed that before applying voltage to the generator 10, the bus capacitor 11 is discharged. The transistors 31a, 31b of various branches of the inverter module 30 are in the on-state (conducting) as no control is applied to their respective gates. Likewise, the limiting transistor 12 is in the on-state. When starting the increase in the voltage of the power bus, a current flows in the power bus as the transistors 12, 31a, 31b are all conducting. This current increases quickly until reaching the limiting current $I_{L2}$ of the limiting JFET transistor 12. The latter will then shift into the limiting phase, which causes the current $I_{DS}$ flowing in the bus to be kept at a value close to the limiting current $I_{L2}$ and the voltage $V_{DS}$ of the limiting transistor 12 to increase quickly. The limiting transistor 12 thus becomes a source of current.

As the limiting current $I_{L3}$ is greater than the limiting current $I_{L2}$, the power transistors 31a, 31b do not shift into the limiting phase and they therefore develop little voltage at their terminals. Thus it is mainly the voltage $V_{DS}$ of the limiting transistor 12 that creates a bus voltage enabling the charging of the bus capacitor 11 to commence and enabling the power supply module 15 to be supplied so as to provide quickly an output voltage Vs for the control module for the power transistors 31a, 31b.

As soon as the control module is supplied by the voltage Vs, it is able to control an off-order to the power transistors 31a, 31b so as to switch off the power circuit. The current $I_{DS}$ flowing in the limiting transistor 12 will then fall rapidly and therefore again pass below the limiting current $I_{L2}$, allowing the limiting transistor 12 to leave the limiting phase and to return to the normal conduction phase. The bus capacitor 11 then ends up being charged so as to obtain the proper nominal bus voltage Vb between its terminals. The starting step is terminated and the alternating voltage generator then shifts into normal operation.

Due to the difference between the limiting current $I_{L2}$ of the limiting transistor 12 and that $I_{L3}$ of the power transistors 31a, 31b, the heat dissipation during starting is mainly concentrated on the limiting transistor 12. This allows there to be, for the generator 10, only a single JFET transistor of significant size in order to accommodate the transitory starting phase, the duration of which is typically of the order of only a few milliseconds or even a few tens of milliseconds, which prevents too great a heating of the limiting transistor 12.

In normal operation, as the nominal current flowing in the power bus is less than the limiting current $I_{L2}$ of the limiting normally-on JFET transistor 12, the heat dissipation of the limiting transistor 12 is therefore very low, leading to very low losses.

The power transistors 31a, 31b are obviously chosen to have a limiting current $I_{L3}$ with a value higher than the maximum current likely to flow in the load 40, in order to avoid them shifting into the limiting phase. Moreover, the limiting JFET transistor 12 should be chosen so that the maximum voltage $V_{DS}$ it has to withstand during the limiting phase is less than its avalanche voltage.

It is obvious that other variants and improvements in detail may be imagined, and even the use of equivalent means envisaged, without departing from the scope of the invention.

The invention claimed is:

1. Alternating voltage generator comprising a direct voltage source that supplies a power bus, a bus capacitor connected between a positive terminal and a negative terminal of the power bus, an inverter module supplied by the power bus and equipped with several normally-on JFET power transistors in order to deliver an alternating voltage, characterized in that the generator comprises a current limiting normally-on JFET transistor which is located on the power bus in series between the bus capacitor and the inverter module, the limiting current of the limiting transistor being less than the limiting current of each of the power transistors of the inverter module.

2. Voltage generator according to claim 1, characterized in that the source of the limiting transistor is connected to the gate of the limiting transistor.

3. Voltage generator according to claim 2, characterized in that the limiting transistor is located on a positive line of the power bus, the drain of the limiting transistor being connected on the side of the bus capacitor and the source of the limiting transistor being connected on the side of the inverter module.

4. Voltage generator according to claim 1, characterized in that it comprises a power supply module that is supplied by the power bus and which delivers an output voltage to a control module intended to control the gates of the power transistors of the inverter module.

5. Voltage generator according to claim 1, characterized in that the inverter module comprises three branches for delivering a three-phase alternating voltage, each branch being equipped with two normally-on JFET power transistors in series between the positive terminal and the negative terminal of the power bus.

6. Voltage generator according to claim 1, characterized in that the direct voltage source comprises a rectifier module that is supplied by an external power supply network and which is equipped with several diodes.

7. Speed controller intended to deliver alternating voltage to an electric motor, characterized in that it comprises an alternating voltage generator according to one of claims 1 to 6.

8. Uninterruptible power supply intended to deliver an alternating voltage to an alternative electrical network, characterized in that it comprises an alternating voltage generator according to one of claims 1 to 5.

* * * * *